United States Patent [19]

Koshiba et al.

[11] Patent Number: 5,015,547
[45] Date of Patent: May 14, 1991

[54] LITHIUM SECONDARY CELL

[75] Inventors: Nobuharu Koshiba, Ikoma; Shuichi Nishino; Kenichi Takata, both of Hirakata; Toshihiko Ikehata, Katano, all of Japan

[73] Assignee: Matsushita Electric Industrial Co., Ltd., Osaka, Japan

[21] Appl. No.: 375,468

[22] Filed: Jul. 5, 1989

[30] Foreign Application Priority Data

Jul. 8, 1988 [JP] Japan .................. 63-171272

[51] Int. Cl.$^5$ .............................. H01M 4/48
[52] U.S. Cl. ..................... 429/194; 429/218
[58] Field of Search .................. 429/194, 218

[56] References Cited

U.S. PATENT DOCUMENTS

| | | | |
|---|---|---|---|
| 4,464,447 | 8/1984 | Lazzari et al. | 429/194 |
| 4,751,158 | 6/1988 | Uchiyama et al. | 429/218 X |
| 4,786,499 | 11/1988 | Slane et al. | 429/218 X |

FOREIGN PATENT DOCUMENTS 62-59412 12/1987 Japan .
63-1708 1/1988 Japan .

OTHER PUBLICATIONS

Denki Kagaku 50, No. 8 (1982).
Electrochimica Acta, vol. 28 No. 1, Jan. 1983, pp. 17–22, Pergamon Press Ltd., Oxford, GB; N. Kumagai et al.: "Structural Changes of Nb2O5 and V2O5 as Rechargeable Cathodes for Lithium Battery".
Extended Abstracts, vol. 86-2, "Fall Meeting San Diego, Calif., 19th–24th Oct. 1986", pp. 28–29, Princeton, NJ, U.S.; J. J. Auborn et al.: Lithium Intercalation Cells without Metallic Lithium: MoO2/LiCoO2 and WO2/LiCoO2.
Patent Abstracts of Japan, vol. 6, No. 28 (E-95) [906], 19th Feb. 1982; & JP-A-56 147 368 (Yuasa Denchi K.K.) 16-11-1981.
Journal of Power Sources, vol. 20, Nos. 3–4, Jul. 1987, pp. 187–192, Lesevier Sequoia, Lausanne, CH: Y. Muranishi et al.: "Insertion of Lithium into Vanadium Molybdenum Oxides".

*Primary Examiner*—Stephen J. Kalafut
*Attorney, Agent, or Firm*—Stevens, Davis, Miller & Mosher

[57] ABSTRACT

A chargeable lithium secondary cell comprising a positive electrode composed mainly of vanadium pentaoxide, a negative electrode of a compound of lithium with niobium pentaoxide and an electrolyte of an organic solvent in which a lithium salt is dissolved, wherein resistance to overdischarge is obtained by a constitution that the molar ratio of the niobium pentaoxide to vanadium pentaoxide is from not less than 0.5 to not more than 1 and the molar ratio of the total litium contained in the positive and negative electrodes to vanadium pentaoxide is from not less than 1.1 to not more than 2.

3 Claims, 6 Drawing Sheets

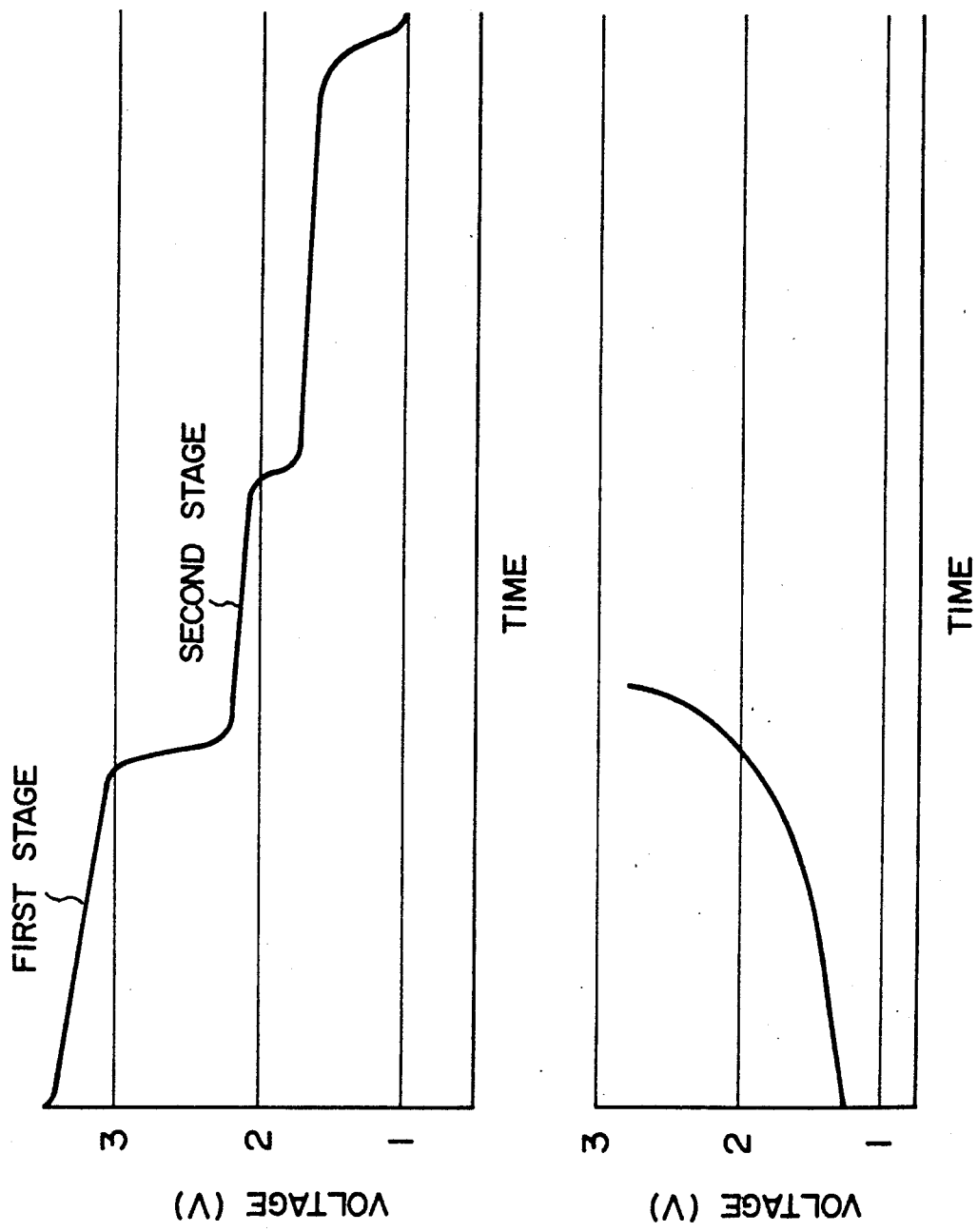

LITHIUM SECONDARY CELL

BACKGROUND OF THE INVENTION

The present invention relates to a chargeable and dischargeable lithium secondary cell usable as a movable DC power source, a backup power source, etc. More specifically, it relates to improvement of a lithium secondary cell comprising a nonaqueous electrolyte containing lithium ions, a positive electrode of vanadium pentaoxide and a negative electrode of niobium pentaoxide doped with lithium.

DESCRIPTION OF RELATED ART

A chargeable lithium secondary cell using lithium as a negative electrode has a high energy density in principle, and it has therefore attracted attention recently and is now under energetic development by many manufacturers. However, due to dendrite or a mossy precipitate of lithium, which evolves in a lithium negative electrode in charge and discharge, a continuity state occurs between the positive and negative electrodes or a short circuit is caused within the cell, and the original form of the negative electrode itself is gradually deformed into deterioration. Hence, it has been very difficult to achieve a long cycle life of charge and discharge in the lithium secondary cell.

As a result, an attempt to use lithium alloy, which occludes and discharges lithium, is under way in order to solve the above defect. Since, however, the alloy is likely to fall apart in occlusion and discharge of a large amount of lithium, a necessarily sufficient effect has not yet been obtained, and it has been still desired to improve the negative electrode.

Further, in another attempt, there is a cell system using a combination of vanadium pentaoxide having a high potential as a positive electrode and niobium pentaoxide as a negative electrode (Japanese Patent KOKOKU=Post-Exam. Publn.=No. 62-59412). This niobium pentaoxide is easily doped or undoped with lithium ions, and is considered to be well enduring against deep charge and discharge.

In the above cell system, however, the constitutional conditions of the positive and negative electrodes show differences in voltage and electric capacity, and no sufficient characteristics have not yet been obtained. Hence, the cell system has not yet been actually industrialized.

SUMMARY OF THE INVENTION

The main object of the present invention is to provide a lithium secondary cell, a cell system using vanadium pentaoxide as a positive electrode and lithium doped niobium pentaoxide as a negative electrode, which has a high voltage and electric capacity and which is excellent in resistance to overdischarge and a cycle life of charge and discharge.

To achieve the above object, the present inventors have studied the charge and discharge characteristics of vanadium pentaoxide and niobium pentaoxide, and arrived at a constitution wherein the molar ratio of the amount of niobium pentaoxide introduced is not less than 0.5 to not more than 1 to vanadium pentaoxide, and the molar ratio of the total amount of lithium contained in the positive and negative electrodes is not less than 1.1 to not more than 2 to vanadium pentaoxide and not more than 2 to niobium pentaoxide.

BRIEF DESCRIPTION OF DRAWINGS

FIG. 2 is a discharge characteristics diagram of vanadium pentaoxide.

FIG. 3 is a discharge characteristics diagram of niobium pentaoxide.

DETAILED DESCRIPTION OF THE INVENTION

Figure 1:
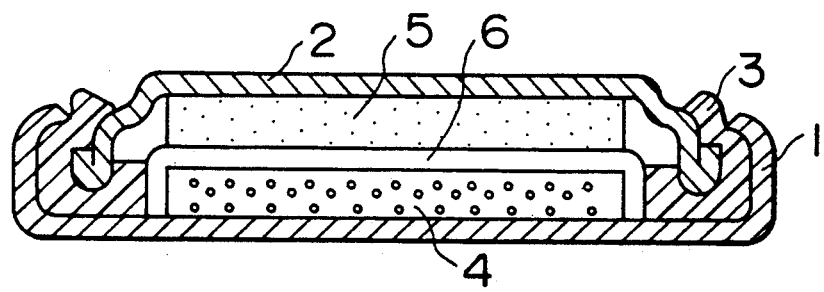
FIG. 1 is a vertical sectional view of a chargeable and dischargeable coin-formed lithium secondary cell according to the present invention.

In the cell system of the present invention, in discharge, lithium doped into niobium as a negative electrode dissolves out, in the form of lithium ions, in an electrolyte, and moves to a positive electrode to be doped into vanadium pentaoxide. And, in charge, a reverse movement reaction takes place. Namely, it is only lithium that moves between the positive electrode and the negative electrode.

Meanwhile, the charges and discharges of vanadium pentaoxide and niobium pentaoxide are considered to take place as follows.

Positive electrode: $V_2O_5 + nLi^+ + ne \underset{\text{charge}}{\overset{\text{discharge}}{\rightleftharpoons}} Li_n \cdot V_2O_5$ Reaction at first stage
$n \approx 1$ (3.5~3 V in the vicinity of vsLi)
Reaction up to second stage
$n \approx 1.7~2$ (2.5~2 V in the vicinity of vsLi)

Negative electrode: $Nb_2O_5 + nLi^+ + ne \underset{\text{discharge}}{\overset{\text{charge}}{\rightleftharpoons}} Li_n \cdot Nb_2O_5$ $n \approx 2$ (2~1 V in the vicinity of vsLi)

In charge and discharge reactions of vanadium pentaoxide, as shown in FIG. 2, the reaction in the first stage, when the lithium potential is taken as zero, proceeds from the vicinity of 3.5 V to the vicinity of 3 V, and the reaction in the second stage proceeds from a voltage of below 3 V to the vicinity of 2 V. And, in general, the reaction in the first stage is excellent in a cycle life of charge and discharge, and when the reaction proceeds over the second stage into a deep discharge of not more than 1 V, the cycle life of charge and discharge tends to decrease to a great extent. It is therefore possible to achieve a long cycle life of charge and discharge by limiting the reaction to the charge and discharge in the first or second stage.

The discharge of niobium pentaoxide as a negative electrode is a one-stage reaction as shown in FIG. 3, and it is generally a double-electron reaction as shown in literature, DENKI KAGAKU 50, No. 8 (1982) $Nb_2O_5$ as an Active Material of Positive Electrode for Nonaqueous Lithium Secondary Cells. On the basis of these data, the electric capacity in the first stage reaction of vanadium pentaoxide is nearly identical with that of niobium pentaoxide when the molar ratio of vanadium pentaoxide to niobium pentaoxide is 1:0.5. And it is generally thought that niobium pentaoxide exhibits very stable charge and discharge characteristics when it has a higher potential than that of metallic lithium by 1 volt or more.

For this reason, in order to obtain a maximum electric capacity, the electric capacity of niobium pentaoxide is to be not less than that in the first stage reaction of vanadium pentaoxide, i.e. its molar ratio to vanadium pentaoxide is to be not less than 0.5. And, in order to prevent the discharge of vanadium pentaoxide from proceeding over the second state reaction even in a worst case, the molar ratio of niobium pentaoxide to vanadium pentaoxide is to be not more than 1.

The amount of lithium introduced should be considered, in principle, in the same way as with the amount of niobium pentaoxide, and the amount of lithium is 1 equivalent to 2 equivalents i.e., between 1 and 2 in molar ratio to vanadium pentaoxide.

However, there is residual lithium in vanadium pentaoxide and niobium pentaoxide to some extent, which does not undergo charge and discharge reactions. Hence, the molar ratio of the lithium is to be at least 1.1 in order to compensate the loss of such residual content.

Further, the amount of lithium is considered to be such an amount that gives about the same electric capacity as that of niobium pentaoxide, however, such an amount is not always required. In order to obtain a maximum cycle life of charge and discharge of niobium pentaoxide, the amount of lithium is rather to be limited. When the amount of lithium is identical with, or more than, that of niobium pentaoxide in electric capacity, shallow charge and discharge proceed without any problem, however, deep charge and discharge use up niobium pentaoxide and the crystal lattice of niobium pentaoxide is therefore likely to break, which is disadvantageous for the cycle life of charge and discharge. On the other hand, when the amount of lithium introduced is less than that of niobium pentaoxide in electric capacity, even deep charge and discharge do not utilize all of the niobium pentaoxide, and a stable cycle life of charge and discharge can be hence secured.

For the above reasons, it is more advantageous that the molar ratio of lithium to niobium pentaoxide is not more than 2.

In the above constitutional ratio, vanadium pentaoxide in a charging state shows a potential of about 3.5 V to pure lithium, and that of niobium pentaoxide is in the vicinity of about 1.5 V. Thus, it is possible to obtain a cell having a cell voltage of about 2 V.

The foregoing means not only that the charge and discharge characteristics can be improved but also that a high voltage of about 2 V can be obtained, which improves the energy density more.

Meanwhile, the above-quoted Japanese Patent KOKOKU=Post Exam. Publn.=No. 62-59412 describes a limitation of the electric capacity of a negative electrode, in which the first stage reaction of vanadium pentaoxide is also limited by the limitation of lithium of a negative electrode. Hence, the electric capacity is not necessarily maximum in efficiency.

Further, niobium pentaoxide is introduced as a negative electrode in such an amount that its molar ratio to vanadium pentaoxide is not less than 1 (double in electric capacity), and yet, the molar ratio of lithium to vanadium pentaoxide is not more than 1 (half of or less than half of the electric capacity of niobium pentaoxide), or the amount of lithium is limited in a state that a very large amount of niobium pentaoxide is existent. In this case, the resulting cell has a voltage of about 1.5 V and is ranked as a cell of 1.5 V type. Thus, the aim of this Publication completely differs from that of the present invention.

The features of the present invention are, as discussed previously, that it has had an object in obtaining as high as possible a voltage, a maximal energy density and a long-lasting cycle life of charge and discharge and found an optimal constitutional ratio of vanadium pentaoxide, niobium pentaoxide and lithium.

According to the present invention there is provided a lithium secondary cell having a voltage of about 2 V, a good cycle life of charge and discharge and excellent resistance to overdischarge.

The present invention will be illustrated hereinbelow with reference to some examples.

EXAMPLES

FIG. 1 is a cross-sectional view of a lithium secondary cell of the present invention; 1 indicates a case which also works as a positive electrode terminal. 2 indicates a sealing plate which also works as a negative electrode terminal. 3 indicates a polypropylene gasket to insulation-seal the case and the sealing plate. 4 indicates a positive electrode, which was prepared by kneading 90 wt. % of vanadium pentaoxide, 5 wt. % of carbon black as a conductive agent, and 5 wt. %, as a solid content, of an aqueous dispersion of a fluorine resin as an adhesive, drying and pulverizing the mixture, then forming the mixture into pellets having a diameter of 15 mm, and dehydrating the pellets by vacuum-drying at 150° C. The amount of vanadium pentaoxide in the positive electrode was 238 g (equivalent to an electric capacity of about 35 mAh in the first stage reaction proceeding from the vicinity of 3.5 V). 5 indicates a negative electrode, which was prepared by kneading 90 wt. % of niobium pentaoxide, 5 wt. % of carbon black as a conductive agent and 5 wt. %, as a solid content, of a fluorine resin as a binding agent in aqueous solution, drying and pulverizing the mixture, forming it into pellets having a diameter of 15 mm, dehydrating the pellets by vacuum-drying at 150° C. to form a compounded agent, bringing a desired lithium foil into intimate contact with the compounded agent, and immersing the foil in a propylene carbonate solution containing 1 mole/l of lithium perchlorate to dope lithium into niobium pentaoxide. 6 indicates a separator made of a bilayer laminate consisting of a propylene fine porous membrane and nonwoven fabric. The electrolyte used was prepared by dissolving 1 mole/l of lithium perchlorate in a 1:1 mixed solvent of propylene carbonate and 1,2-dimethoxy ethane. The cells prepared here had a diameter of 20 mm and a thickness of 2.5 mm.

On the basis of the above basic constitution, at first, the effects on ratios of vanadium pentaoxide and niobium pentaoxide were compared by using a fixed amount of vanadium pentaoxide and changing the ratio of niobium pentaoxide as shown in Table 1. In addition, in this case, the amount of lithium was identical with the equivalent of niobium pentaoxide in electric capacity, i.e. double in molar ratio.

TABLE 1

| No. | Ratio of niobium pentaoxide (to vanadium pentaoxide) | | | | |
|---|---|---|---|---|---|
|  | 1 | 2 | 3 | 4 | 5 |
| Molar ratio of niobium pentaoxide | 0.25 | 0.5 | 0.75 | 1 | 1.5 |
| Electric | 0.5 | 1 | 1.5 | 2 | 3 |

TABLE 1-continued

| | Ratio of niobium pentaoxide (to vanadium pentaoxide) | | | | |
|---|---|---|---|---|---|
| No. | 1 | 2 | 3 | 4 | 5 |
| capacity ratio | | | | | |

In Table 1, the electric capacity ratio shows an electric capacity ratio of niobium pentaoxide when that of vanadium in the first stage discharge reaction is taken as 1, and, on the basis of the afore-mentioned reaction formulae of positive and negative electrodes, the ratio in electric capacity of niobium pentaoxide is twice as large as the molar ratio. Cells prepared according to the foregoing procedures are numbered as 1 through 5. These cells were used to measure electric capacities by allowing them to discharge at a constant current of 500 μA, and the results are shown in FIG. 4.

Then, the cells, to each of which a load resistance of 3 KΩ was connected, were left to stand at 60° C. for 1 month to keep them in an overdischarge state, then charged at 500 μA up to 2.2 V, and allowed to discharge at a constant current of 500 μA to measure hours during which the voltage went down to 1 V. The results are shown in FIG. 5.

Figure 4:
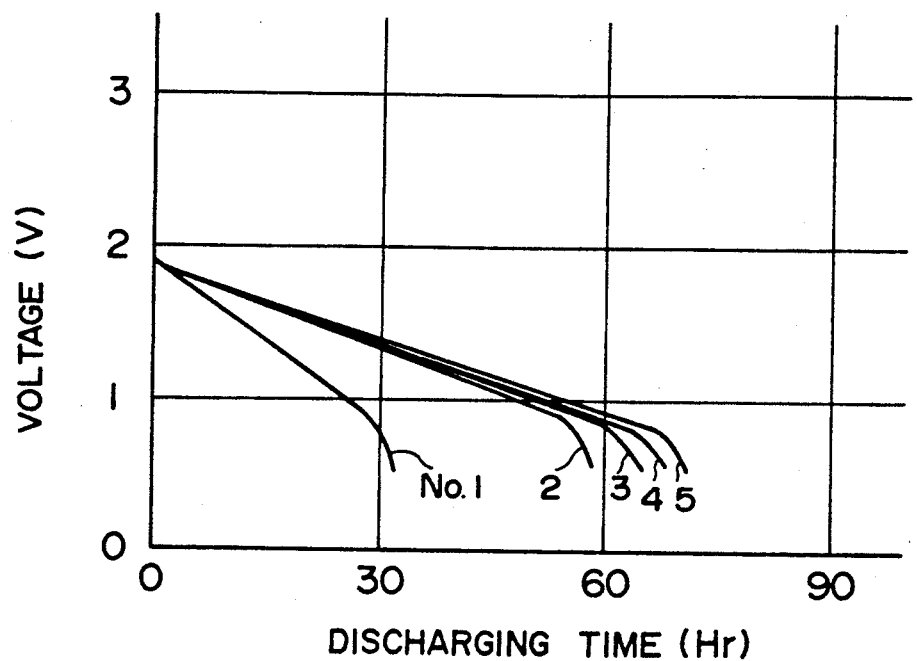
FIGS. 4 to 9 are characteristics diagrams of the present invention.

As is clearly shown in FIG. 4, when the molar ratio of niobium pentaoxide to vanadium pentaoxide in No. 1 is 0.25, the duration period of time is the shortest, and when the molar ratios are not less than 0.5 mentioned in No. 2, the values for the duration period of time during which the voltage went down to 1 V were nearly constant.

Figure 5:
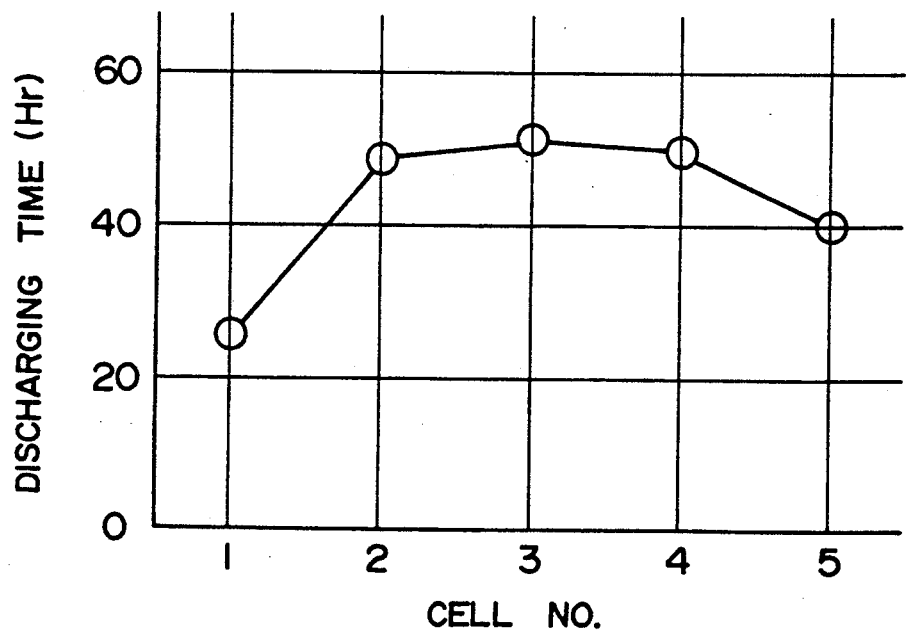

FIG. 5 shows that, after the overdischarge, the cell No. 5 having a molar ratio of 1.5 exhibited some decrease in duration period of time. It is considered that since the discharge of vanadium pentaoxide proceeded over the second stage due to the overdischarge, the reversibility of charge and discharge of vanadium pentaoxide was lost.

The above results show that when the molar ratio of packed niobium pentaoxide is in the range of from not less than 0.5 to not more than 1, a large electric capacity and full resistance to overdischarge can be obtained.

Then, the molar ratio of vanadium pentaoxide to niobium pentaoxide was set at 1:0.75 so that their ratio in electric capacity was 1:1.5, and the amount of lithium introduced was adjusted as shown in Table 2.

TABLE 2

| | Ratio of lithium in electric capacity (to vanadium pentaoxide) | | | | | |
|---|---|---|---|---|---|---|
| No. | 6 | 7 | 8 | 9 | 10 | 11 |
| Electric capacity ratio of lithium | 0.5 | 1.0 | 1.1 | 1.5 | 2.0 | 2.5 |

Figure 6:
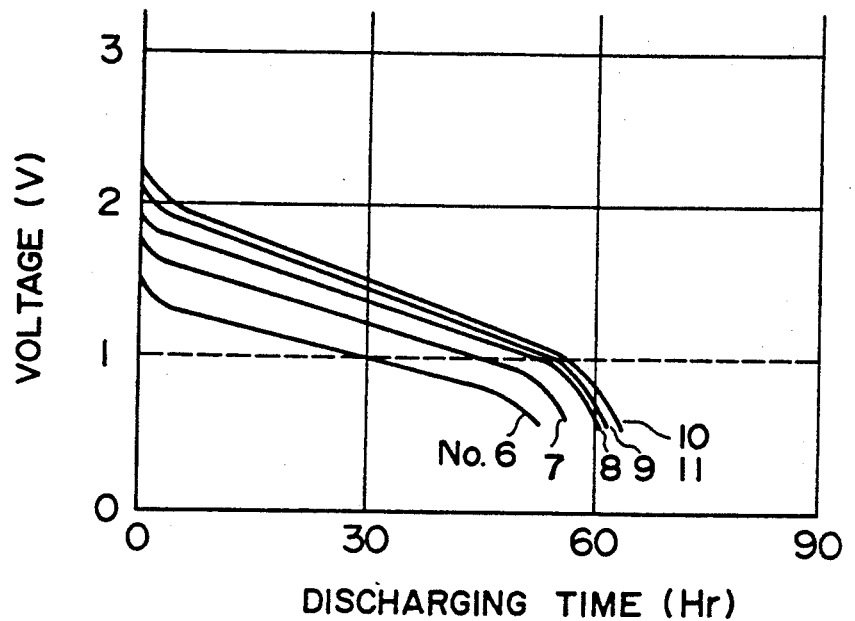
Figure 7:
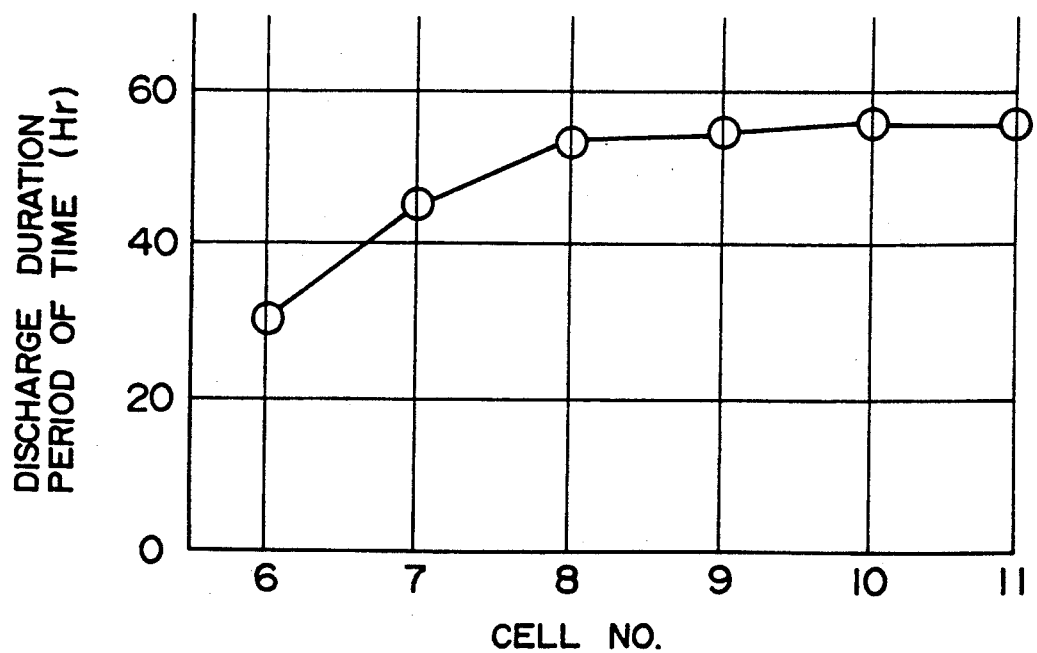
Figure 8:
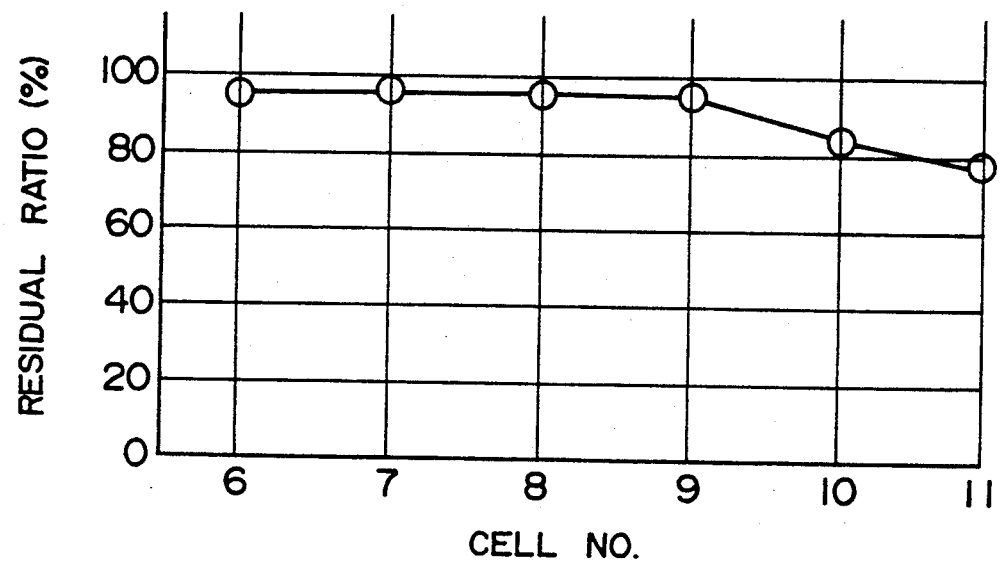

Cells prepared according to the above procedure are numbered as 6 through 11, and these cells were used to allow them to discharge at a constant current of 500 μA. FIG. 6 shows their discharge characteristics, and FIG. 7 shows discharge duration period of time during which the voltage went down to 1 V. Then, charge and discharge were repeated 500 times at a constant current of 500 μA between 2.2 V and 1.5 V. Thereafter, the cells were charged at 500 μA to 2.2 V and then the duration hours of discharge were measured by allowing them to discharge at 500 μA down to 1 V. FIG. 8 shows change ratios (residual ratio) of duration hours based on comparison with the initial data shown in FIG. 6.

Figure 9:
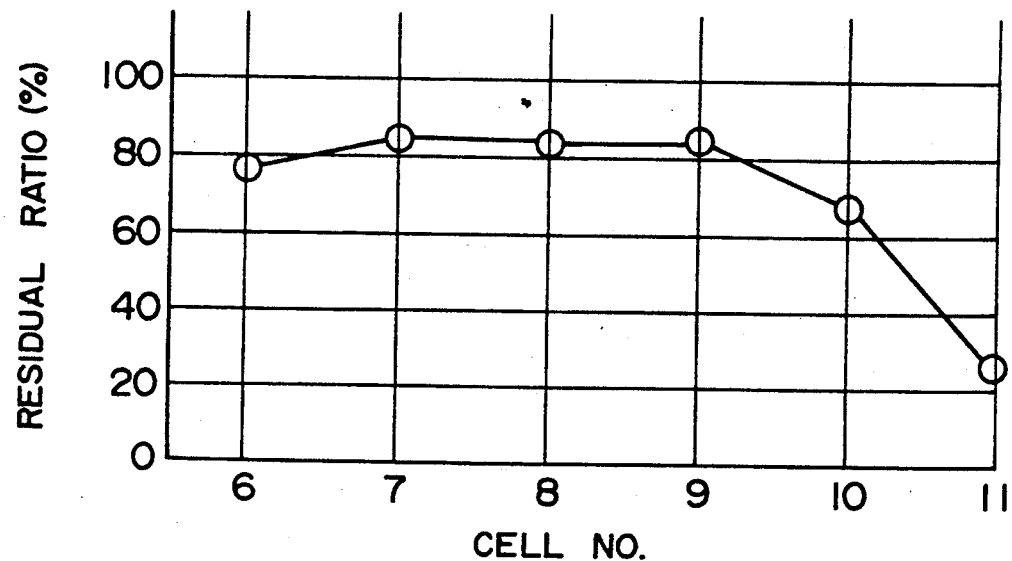

Similarly, the discharge of the cells at a constant current of 500 μA between 2.2 V and 0 V was repeated 100 times. Then the cells were charged at 500 μA up to 2.2 V and then the discharge duration hours were measured by allowing them to discharge at 500 μA down to 1 V. FIG. 9 shows change ratios (residual ratio) of duration hours based on comparison with the initial data shown in FIG. 6.

As is clearly seen in FIG. 6, with an increasing ratio of lithium, the discharge start voltage is high or in the vicinity of 2 V, and when the ratio of lithium is to the contrary or extremely low as in No. 6, the discharge start voltage is as low as about 1.5 V. Further, as is clear in FIG. 7, the larger the ratio of lithium is, the longer the discharge duration period of time is, and when it is 1.1 or more, the discharge duration period of time is constant. Concerning the ratio of lithium 1.0 in No. 7, it is considered that since a part of lithium which was once doped into niobium pentaoxide did not come out even in discharge, the electric capacity decreased to some extent.

And even if the amount of lithium is further increased, it is not always possible to obtain an electric capacity equivalent to that of vanadium pentaoxide, i.e. 35 mAh (about 70 hours at 500 μA).

It is considered that this is because the reaction of vanadium pentaoxide in the afore-mentioned reaction formula does not show n=1 and because the reaction efficiency of vanadium pentaoxide decreases due to a limited amount of an electrolyte in the cell.

On the other hand, FIG. 8 shows that, in a shallow discharge, the electric capacity deteriorates little even after 500 cycles, and it is fairly good even in No. 10. No. 11 shows a decrease in the electric capacity to some extent.

However, in deep charge and discharge between 2.2 V and 0 V shown in FIG. 9, the cells in which the amount of lithium is not more than 1.5 in electric capacity ratio show comparatively small deterioration, and when it amounts to 2.0, the deterioration increases to some extent. No. 11 in which the electric capacity ratio is 2.5 shows the deterioration to a considerable extent.

The reasons therefor are considered to be as follows. Since niobium pentaoxide was used up in over-discharge due to an increased ratio of lithium, the crystal lattice was partly broken, and since a large amount of lithium ions migrated into or out of the niobium pentaoxide, it swelled or shrank to a large extent. Hence, the compounded agent of niobium pentaoxide was partly eliminated, and the efficiency in charge and discharge decreased. Further, as far as No. 11 is concerned, there is an additional reason that since the reaction in the positive electrode proceeded over the second stage, the positive electrode characteristic also deteriorated.

For these reasons, it is preferable that the molar ratio of lithium to vanadium pentaoxide is from not less than 1.1 to not more than 2, and it is further preferable that this molar ratio to niobium pentaoxide is not more than 2.

To summarize the foregoing, the preferred constitutional ratios are:

$x = Nb_2O_5/V_2O_5$  $\quad 0.5 \leq x \leq 1.0$ (molar ratio)

$y = Li/V_2O_5$  $\quad 1.1 \leq y \leq 2.0$ (molar ratio)

Among these, the following is particularly preferable.

$$z = Li/Nb_2O_5 \quad z \leqq 2.0 \text{ (molar ratio)}$$

The weight ratios for the above are as follows.

$$0.73 \leqq x \leqq 1.46$$
$$0.042 \leqq y \leqq 0.076, \text{ and}$$
$$z \leqq 0.052$$

Figure 10:
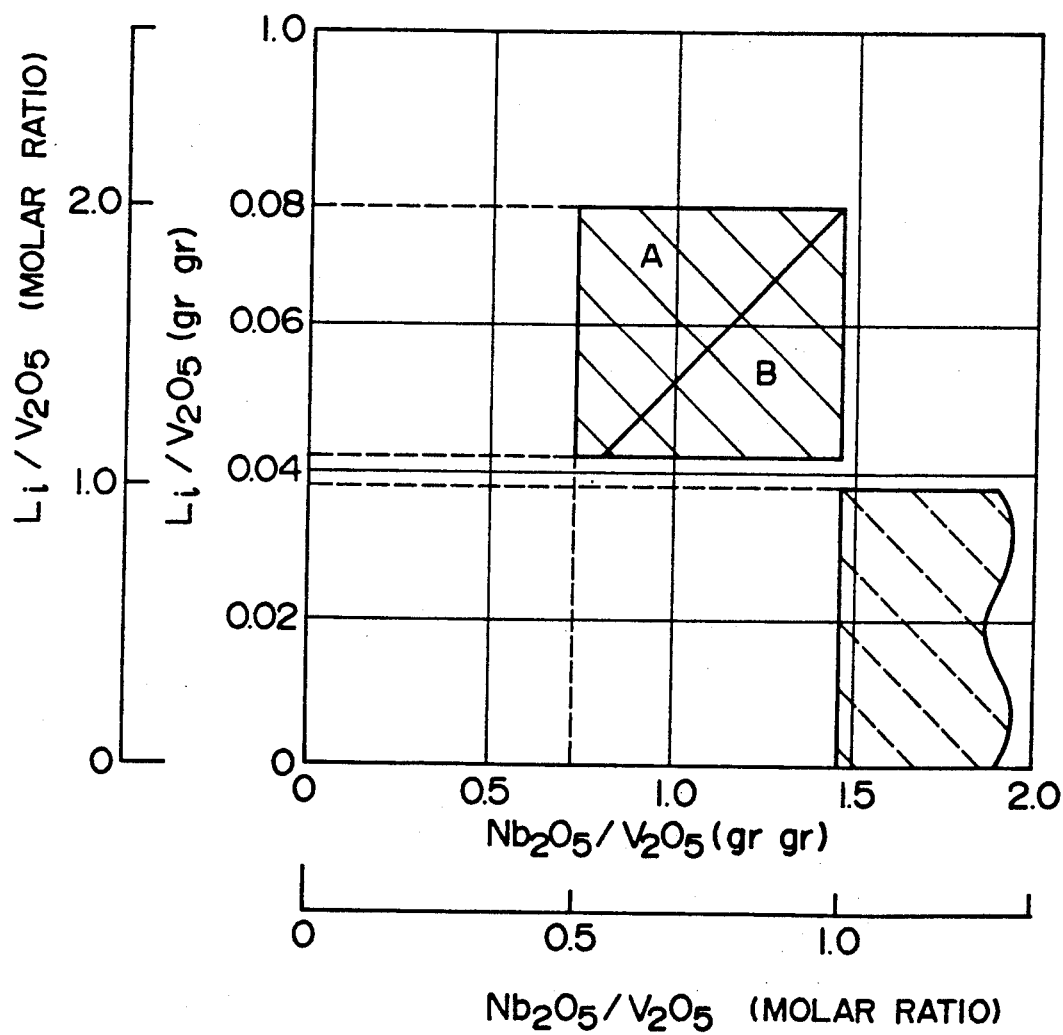
FIG. 10 is a constitution diagram of the present invention.

Further, when the weight of vanadium pentaoxide is taken as 1, the weight ratios of niobium pentaoxide and lithium are as shown in FIG. 10, in which the region hatched with solid oblique lines represents the scope of the present invention. A+B represents the scope of claim 1, and B represents the scope of claim 2.

And the region heated with dotted oblique lines represents the scope of Japanese Patent KOKOKU (Post-Exam. Publn.) No. 62-59412.

The present invention is essentially different from the content described in Japanese Patent KOKOKU (Post-Exam. Publn.) No. 62-59412, and as a result of a study from various aspects, the optimum constitutional ratios for the subject cell system have been found for the first time. In the region of the present invention, a cell voltage in the vicinity of 2 V is accomplished, and at the same time, it is possible to achieve a large energy density, a long cycle life of charge and discharge and excellent resistance to overdischarge.

Meanwhile, Examples used an electrolyte prepared by mixing propylene carbonate and 1,2-dimethoxy ethane in a volume ratio of 1:1 and dissolving 1 mole/l of lithium perchlorate in the mixture. As another solvent, it is also possible to use ethylene carbonate, butylene carbonate, ethoxymethoxyethane, 1,2-diethoxymethane, 2-methyltetrahydrofuran, etc. Further, as another solute, it is possible to use lithium borofluoride, lithium 6-fluoroarsenate, lithium 6-fluorophosphate, lithium trifluoromethanesulfonate, etc.

Further, in addition to a coin form selected as a cell form in Examples, a cylindrical form, box form, etc., may be also selected.

In addition, quantitative measurement of an amount of lithium in a cell can be carried out by the chemical or some other analysis of lithium present in positive and negative electrodes as lithium compounds.

What is claimed is:

1. A lithium secondary cell having an electrolyte of an organic solvent in which a lithium salt is dissolved, and using a positive electrode of vanadium pentaoxide and a negative electrode of a compound of lithium with niobium pentaoxide in a charging state, wherein the amount of niobium pentaoxide is such that the molar ratio of the niobium pentaoxide to the vanadium pentaoxide is from not less than 0.5 to not more than 1, and the molar ratio of the total amount of lithium contained in the positive and negative electrodes to the vanadium pentaoxide is from not less than 1.1 to not more than 2.

2. A lithium secondary cell according to claim 1 wherein the molar ratio of the lithium to the niobium pentaoxide is not more than 2.

3. A lithium secondary cell according to claim 1 wherein the molar ratio of the lithium to the niobium pentaoxide is more than 2.

* * * * *